United States Patent
Utaki et al.

(10) Patent No.: US 8,940,081 B2
(45) Date of Patent: Jan. 27, 2015

(54) COMBUSTIBLE GAS ENRICHMENT APPARATUS

(75) Inventors: Takahisa Utaki, Kyotanabe (JP); Hajime Morioka, Kobe (JP); Tamotsu Kotani, Kizugawa (JP)

(73) Assignee: Osaka Gas Co., Ltd., Osaka (JP)

( * ) Notice: Subject to any disclaimer, the term of this patent is extended or adjusted under 35 U.S.C. 154(b) by 232 days.

(21) Appl. No.: 13/575,099

(22) PCT Filed: Jan. 24, 2011

(86) PCT No.: PCT/JP2011/051239
§ 371 (c)(1),
(2), (4) Date: Oct. 12, 2012

(87) PCT Pub. No.: WO2011/093246
PCT Pub. Date: Aug. 4, 2011

(65) Prior Publication Data
US 2013/0136660 A1    May 30, 2013

(30) Foreign Application Priority Data

Jan. 26, 2010  (JP) .................................. 2010-014532
Jan. 26, 2010  (JP) .................................. 2010-014533

(51) Int. Cl.
*B01D 53/04*    (2006.01)
*C10L 3/10*    (2006.01)
*B01D 53/02*    (2006.01)

(52) U.S. Cl.
CPC ............ *B01D 53/02* (2013.01); *B01D 53/0454* (2013.01); *C10L 3/10* (2013.01); *B01D 2253/102* (2013.01); *B01D 2253/106* (2013.01); *B01D 2253/108* (2013.01); *B01D 2253/204* (2013.01); *B01D 2253/304* (2013.01);

(Continued)

(58) Field of Classification Search
USPC ................... 96/111, 115; 95/8, 11, 143–147; 585/820, 821
See application file for complete search history.

(56) References Cited

U.S. PATENT DOCUMENTS 4,305,734 A * 12/1981 McGill ........................ 95/102
4,472,177 A *  9/1984 Sircar ............................ 95/11
4,516,424 A *  5/1985 Rowland ..................... 73/31.02

(Continued)

FOREIGN PATENT DOCUMENTS

AU    2007315541 B8    5/2008
AU    2007315542 B2    5/2008

(Continued)

*Primary Examiner* — Frank Lawrence
(74) *Attorney, Agent, or Firm* — The Webb Law Firm (57) ABSTRACT

In order to provide a technique for enriching a combustible gas that allows enrichment of the combustible gas to a higher concentration in an efficient manner with minimization of loss of a source material, there are provided an adsorption tower charged with an adsorbent, a feeding/discharging means for feeding a source gas containing a combustible gas and air, a collecting means for desorbing the combustible gas adsorbed to the adsorbent and collecting the desorbed gas, a controlling means for sequentially effecting a combustible gas adsorption process and a combustible gas desorption process, a detecting means for detecting the concentration of the combustible gas in the source gas, and an operation condition setting section for varying an adsorption completion timing for the controlling means to complete the adsorption process, based on the combustible gas concentration detected by the detecting means.

6 Claims, 5 Drawing Sheets (52) U.S. Cl.
CPC .... *B01D 2253/308* (2013.01); *B01D 2256/245* (2013.01); *B01D 2257/102* (2013.01); *B01D 2257/104* (2013.01)
USPC .............................. 96/111; 96/115; 585/821

(56) References Cited

U.S. PATENT DOCUMENTS

| | | | |
|---|---|---|---|
| 4,521,221 A | | 6/1985 | Richter et al. |
| 4,552,570 A | * | 11/1985 | Gravatt .............................. 95/10 |
| 4,995,890 A | * | 2/1991 | Croudace ........................ 96/111 |
| 5,154,735 A | * | 10/1992 | Dinsmore et al. ................. 95/92 |
| 6,383,256 B1 | * | 5/2002 | Phillips .............................. 95/12 |
| 8,016,914 B2 | * | 9/2011 | Belanger et al. .................... 95/8 |
| 2009/0260518 A1 | * | 10/2009 | Wright et al. ...................... 95/11 |
| 2010/0005958 A1 | * | 1/2010 | Seki et al. .......................... 95/26 |
| 2010/0115840 A1 | | 5/2010 | Shito et al. |

FOREIGN PATENT DOCUMENTS

| | | |
|---|---|---|
| CN | 101564634 A | 10/2009 |
| CN | 101617030 A | 12/2009 |
| CN | 101617031 A | 12/2009 |
| EP | 2111905 A1 | 10/2009 |
| JP | 58-198591 A | 11/1983 |
| JP | 60-262890 A | 12/1985 |
| JP | 61-136419 A | 6/1986 |
| JP | 63-065929 A | 3/1988 |
| JP | 64-047421 A | 2/1989 |
| JP | 03-290301 A | 12/1991 |
| JP | 11-267439 | 10/1999 |
| JP | 2001-087617 | 4/2001 |
| JP | 2009-262151 A | 11/2009 |
| SG | 156587 | 11/2009 |
| WO | 2008053680 A1 | 5/2008 |
| WO | 2008053681 A1 | 5/2008 |

* cited by examiner

| pressure inside adsorption tower 2 | methane concentration in methane gas PG |
|---|---|
| −10KPa ～ −18KPa | 20.5% |
| −20KPa ～ −30KPa | 25.3% |
| −30KPa ～ −40KPa | 26.1% |
| −40KPa ～ −50KPa | 29.8% |
| −50KPa ～ −60KPa | 31.8% |
| −60KPa ～ −70KPa | 39.5% |
| −70KPa ～ −80KPa | 48.9% |
| −80KPa ～ −87KPa | 59.4% |
| −87KPa ～ −94KPa | 72.9% |
| −94KPa ～ −97KPa | 82.5% |

COMBUSTIBLE GAS ENRICHMENT APPARATUS

TECHNICAL FIELD

The present invention relates to a combustible gas enrichment apparatus configured to feed a source gas containing combustible gas and air to an adsorption tower for adsorption of the combustible gas for its enrichment.

BACKGROUND ART

For effective utilization of a combustible gas, it is necessary to enrich the combustible gas to an appropriate extent by removing gas such as air from the source gas containing the combustible gas. There have been proposed a variety of apparatuses and methods for such enrichment of combustible gas. However, in the case of Patent Document 1 for example, as the source gas, there is employed a gas (so-called coal mine gas) generated from a coal mine that contains methane gas as the combustible gas. And, there is proposed an invention for enriching the methane gas for its utilization through separation of air (containing mainly, nitrogen, oxygen and carbon dioxide) from the source gas with using an adsorbent.

That is, in Patent Document 1, natural zeolite that has a very slow adsorption rate for methane gas as compared with nitrogen is employed as the adsorbent (in other words, there is employed an adsorbent which adsorbs nitrogen, oxygen and carbon dioxide with "priority" over the methane gas). And, there is proposed an invention relating to an apparatus and a method for enriching methane gas by the following technique. Namely, an amount of coal mine gas is introduced to a predetermined pressure into the adsorption tower charged with the adsorbent, with using a compressor or the like. In the course of this, oxygen, nitrogen and carbon dioxide contained in the coal mine gas are caused to be adsorbed first to a fore portion (lower portion) of the adsorption tower and methane gas having the lower adsorption rate is caused to be adsorbed to an aft portion (upper portion) of the adsorption tower. Further, this methane gas is released from the upper portion of the adsorption tower to the atmospheric pressure.

With the above, from the coal mine gas as source gas, methane gas is enriched by removal of the air with using the adsorbent. As a result, this enriched methane can be used as a fuel or the like.

PRIOR ART DOCUMENT

Patent Document

Patent Document 1: Japanese Unexamined Patent Application Publication No. 58-198591 gazette

SUMMARY OF THE INVENTION

Object to be Achieved by Invention

That is, as a configuration for enriching coal mine gas, there is conceived a configuration comprising:

an adsorption tower charged with an adsorbent for adsorbing a combustible gas;

a feeding/discharging means for feeding a source gas containing the combustible gas and air to the adsorption tower and discharging an offgas which is a portion of the source gas not adsorbed to the adsorbent to the outside of the adsorption tower;

a collecting means for desorbing the combustible gas adsorbed to the adsorbent by depressurizing the inside of the adsorption tower to a sub-atmospheric pressure and collecting the desorbed gas through a collecting passage; and a controlling means for sequentially effecting a combustible gas adsorption process wherein the offgas is discharged from the adsorption tower and a combustible gas desorption process wherein the combustible gas desorbed by the collecting means is collected;

With the above-described configuration, when the source gas is introduced to the adsorption tower, the source gas comes into contact with the adsorbent so that the combustible gas contained in the source gas is adsorbed thereon. In this, un-adsorbed components in the source gas will be discharged as they are as an offgas to the outside of the adsorption tower. As a result, inside the adsorption tower, only the combustible gas contained in the source gas will be enriched (adsorption process).

When the adsorbent reaches its adsorption limit for adsorbing the combustible gas, this adsorbent breaks through, upon which the combustible gas begins to be released into the offgas. Therefore, feeding of source gas is stopped before the combustible gas begins to be released as it is into the offgas. And, conversely, with depressurization of the adsorption tower, the combustible gas is discharged from the adsorption tower and this discharged combustible gas is collected through a collecting passage. In this, since the collected combustible gas was selectively adsorbed in the adsorption tower, this collected combustible gas has been enriched to a concentration higher than the concentration thereof in the source gas (desorption process).

As the adsorption process and the desorption process are repeated in sequence, enriched combustible gas will be collected sequentially through the collecting passage.

Incidentally, the controlling means for sequentially effecting the combustible gas adsorption process and the combustible gas desorption process described above contemplates the completion timing of the adsorption process as a timing after lapse of a predetermined period from the beginning of the adsorption process. Alternatively, the completion timing of the adsorption process can be contemplated as the timing that the combustible gas concentration in the offgas at the adsorption process has reached a predetermined concentration.

However, if the completion timing of the adsorption process is judged in the manner described above, the switchover of the respective processes cannot be effected in an efficient manner e.g. when there occurs variation in the combustible gas concentration in the source gas.

For instance, if the completion timing of the adsorption process is judged based on lapse of the adsorption period, in case the combustible gas concentration in the source gas is found lower than an expected concentration, the adsorption process will be completed although the adsorbent in the adsorption tower has not yet reached its break-through point. Conversely, if the combustion gas concentration is found higher than expected, a large amount of combustible gas will be lost as being released into the offgas inadvertently.

Further, if the completion timing of the adsorption process is judged based on the combustible gas concentration in the offgas, the expected adsorption completion timing and the actual adsorption completion timing will differ from each other considerably.

For this reason, there occurs such inconvenience that there is a need to monitor the combustible gas concentration in the offgas for an unnecessarily long period or that when the monitoring is started, the combustible gas concentration is high already, so that the combustible gas concentration that allows appropriate determination of the completion of the adsorption process may not be detected.

Also, the timing of methane gas breaking through the adsorbent may sometimes vary, due to such factors as deterioration in the adsorbing capacity of the adsorbent 21 or the deterioration in the capacity of the blower, etc. In such case too, the methane gas concentration at the timing of completion of adsorption will vary.

In such a situation as described above, in case there has occurred a change in the adsorption characteristics due to e.g. deterioration of the adsorbent 21, there sometimes occurs sudden start of release of methane gas into the offgas OG upon start of break-through of the adsorbent 21 or reduction in the gas flow amount due to deterioration in the capacity of the blower. In such case, there may occur a situation where it takes time until the break-through of the adsorbent. For this reason, if the adsorption completion timing is judged based on the lapse of adsorption period, in case the amount of the combustible gas fed to the adsorbent has decreased due to e.g. reduction in the capacity of the blower, it may happen that the adsorption process is completed prematurely although the adsorbent in the adsorption tower has not yet reached its break-through point. Conversely, in case the adsorbent capacity reduction has occurred due to deterioration of the adsorbent, it may happen that a large amount of combustible gas is lost as being released into the offgas inadvertently. Moreover, if the completion timing of the adsorption process is judged based on the combustible gas concentration in the offgas, the expected adsorption completion timing and the actual adsorption completion timing will differ from each other considerably. Hence, there occurs such inconvenience that there is a need to monitor the combustible gas concentration in the offgas for an unnecessarily long period or that when the monitoring is started, the combustible gas concentration is high already, so that the combustible gas concentration that allows appropriate determination of the completion of the adsorption process may not be detected.

In order to avoid such situations as above, in any case, the operation will be carried out with setting some margin or allowance for the judgment of the adsorption completion. However, when the judgment is made with setting of such margin, the operation will be effected on the safer side; hence, there occurs such problem as the concentration of the source material failing to reach a desired high concentration, occurrence of significant loss of the source material or reduction in the operation efficiency of the enrichment apparatus as a whole. Therefore, there is a need for improvement from the view point of energy saving, and environmental problem such as the global warming, etc.

The present invention has been made in view of the above-described problems and its object is to provide a technique for enriching a combustible gas that allows enrichment of the combustible gas to a higher concentration in an efficient manner with minimization of loss of source material.

Means for Achieving Object

[Configuration 1]

For achieving the above-noted object, according to a characterizing feature of the present invention, a combustible gas enrichment apparatus comprises:

an adsorption tower charged with an adsorbent for adsorbing a combustible gas;

a feeding/discharging means for feeding a source gas containing the combustible gas and air to the adsorption tower via a feeding passage and discharging an offgas which is the portion of the source gas not adsorbed to the adsorbent to the outside of the adsorption tower via a discharging passage;

a collecting means for desorbing the combustible gas adsorbed to the adsorbent by depressurizing the inside of the adsorption tower to a subatmospheric pressure and collecting the desorbed combustible gas through a collecting passage; and a controlling means for sequentially effecting a combustible gas adsorption process for causing the feeding/discharging means to feed the source gas to the adsorption tower and to discharge the offgas from the adsorption tower and a combustible gas desorption process for causing the collecting means to desorb and collect the combustible gas by the collecting means;

wherein the enrichment apparatus further comprises:

a detecting means for detecting the concentration of the combustible gas in the source gas which is fed to the adsorption tower in the adsorption process; and an operation condition setting section for varying an adsorption completion timing for the controlling means to complete the adsorption process based on the combustible gas concentration detected by the detecting means.

[Function/Effect 1]

Namely, since the inventive configuration has the basic construction of the adsorption process of the above-described conventional combustible gas enrichment apparatus, enrichment of combustible gas is possible by effecting the adsorption process and the desorption process sequentially.

In the above, the higher the combustible gas concentration in the source gas, the shorter the feeding period of the combustible gas required by the breakthrough of the adsorbent in the adsorption tower. It then follows that the earlier the adsorption completion timing of the adsorption process, the higher the combustible gas concentration in the source gas. Therefore, by setting the adsorption completion timing appropriately based on the combustible gas concentration in the source gas, it is possible to complete the adsorption process timely with accurate grasping of break-through of the absorbent in the adsorption process, even when a change occurs in the component composition of the source gas.

In the above, since there is provided the detecting means for detecting the concentration of the combustible gas in the source gas which is fed to the adsorption tower in the adsorption process, it is possible to know the concentration of the combustible gas in the source gas to be fed when the adsorption process is to be effected.

And, based on information about the combustible gas concentration in the source gas obtained by the detecting means, the operation condition setting section can variably set the timing of adsorption completion. With this, it becomes possible to set the adsorption completion timing accurately, whereby the source material loss can be minimized and the combustible gas can be enriched to a high concentration in an efficient manner.

[Configuration 2]

In the above configuration, preferably, the operation condition setting section includes a storage section for storing correlation between combustible gas concentrations and adsorption completion timings in the form of a database.

[Function/Effect 2]

When the detecting means detects the combustible gas concentration in the source gas and varies the adsorption completion timing, it is necessary to decide how to vary it. Incidentally, if the kind of adsorbent and the flow rate remain same, the adsorption period from start of the adsorption process to its completion is represented by a liner function of the combustible gas concentration in the source gas. Then, if a storage section is provided for storing this relation or correlation in the form of a database, the operation condition setting section can refer to this storage section and decide an appropriate adsorption completion timing corresponding to the combustible gas concentration in the current source gas and make a new setting based thereon.

[Configuration 3]

For achieving the above-noted object, according to a characterizing feature of the present invention, a combustible gas enrichment apparatus comprises:

an adsorption tower charged with an adsorbent for adsorbing a combustible gas;

a feeding/discharging means for feeding a source gas containing the combustible gas and air to the adsorption tower via a feeding passage and discharging an offgas which is the portion of the source gas not adsorbed to the adsorbent to the outside of the adsorption tower via a discharging passage;

a collecting means for desorbing the combustible gas adsorbed to the adsorbent by depressurizing the inside of the adsorption tower to a subatmospheric pressure and collecting the desorbed combustible gas through a collecting passage; and a controlling means for sequentially effecting a combustible gas adsorption process for causing the feeding/discharging means to feed the source gas to the adsorption tower and to discharge the offgas from the adsorption tower and a combustible gas desorption process for causing the collecting means to desorb and collect the combustible gas;

wherein the enrichment apparatus further comprises:

a detecting means for detecting the concentration of the combustible gas discharged from the adsorption tower in the adsorption process; and an operation condition setting section for varying an adsorption completion timing for the controlling means to complete the adsorption process based on the combustible gas concentration detected by the detecting means.

[Function/Effect 3]

Namely, since the inventive configuration has the basic construction of the adsorption process of the above-described conventional combustible gas enrichment apparatus, enrichment of combustible gas is possible by effecting the adsorption process and the desorption process sequentially.

In the above, since there is provided the detecting means for detecting the concentration of the combustible gas discharged from the adsorption tower in the adsorption process, it is possible to know the concentration of the combustible gas in the offgas to be discharged.

In the above, for the switchover of the respective processes, normally, an adsorption completion timing will be set and the switchover will be judged based on whether the adsorption period has reached this set adsorption completion timing or not. In this regard, the higher the combustible gas concentration in the offgas, the higher the possibility of the adsorbent in the adsorption tower having reached the break-through point sufficiently. So, the adsorption completion timing of the adsorption process can be judged based on the combustible gas concentration in the offgas.

And, since there is provided the operation condition setting means for variably setting the adsorption completion timing for the controlling means to complete the adsorption process based on the combustible gas concentration detected by the detecting means described above, it is possible to determine whether the adsorption completion timing is appropriately set or not, based on the combustible gas concentration in the offgas and to variably set the adsorption completion timing based on this determination.

Further, the switchover of the respective processes can alternatively be judged based on a threshold value for the combustible gas concentration per se in the offgas. In this case too, however, it is possible to judge whether the adsorption completion timing is appropriately set or not in accordance with the combustible gas concentration in the offgas and to variably set the adsorption completion timing based on this judgment.

With this, it becomes possible to set the adsorption completion timing accurately, whereby the source material loss can be minimized and the combustible gas can be enriched to a high concentration in an efficient manner.

[Configuration 4]

Preferably, the adsorption completion timing for the controlling means to complete the adsorption process is judged based on a threshold value for the concentration of the combustible gas discharged from the adsorption tower;

there is provided a storage section for storing, in the form of a database, correlation between a combustible gas concentration detected by the detecting means and a gas concentration correction value for correcting the threshold value; and the operation condition setting means variably sets the adsorption completion timing, based on the correlation obtained in advance.

[Function/Effect 4]

When the detecting means detects the combustible gas concentration in the offgas and varies the adsorption completion timing, it is necessary to decide how to vary it. Incidentally, if the source gas remains the same, there is established a relationship for the adsorption period from start of the adsorption process to its completion that the higher the adsorbing capacity of the adsorbent, the longer the period, and also the greater the feeding amount of the source gas, the shorter the period. Hence, how to vary the timing cannot always be decided based on the property of the adsorbent or variation in the feeding amount of the source gas, etc.

Then, according to the above configuration, the correlation between a combustible gas concentration detected by the detecting means and a gas concentration correction value for correcting the threshold value is stored in the form of a database and the adsorption completion timing is variably set based on the correlation stored in the database. With this, the adsorption completion timing can be learned without having to grasp individually the properties of the adsorbent or variations in the feeding amount of the source gas and the operation condition setting section can variably set an appropriate adsorption completion timing, based on a correlation obtained in advance.

[Configuration 5]

Preferably, the adsorption completion timing for the controlling means to complete the adsorption process is judged based on a lapsed period from the start of the adsorption process;

there is provided a storage section for storing, in the form of a database, correlation between a combustible gas concentration detected by the detecting means and the lapsed period; and the operation condition setting means variably sets the adsorption completion timing, based on the correlation obtained in advance.

[Function/Effect 5]

Further, similarly to the above, with the above configuration wherein the correlation between the combustible gas concentration detected by the detecting means and the lapsed period is stored in the form of a database and the adsorption completion timing is variably set based on the correlation stored in this database, the adsorption completion timing can be learned without having to grasp individually the properties of the adsorbent or variations in the feeding amount of the source gas and the operation condition setting section can variably set an appropriate adsorption completion timing, based on a correlation obtained in advance.

Effect of the Invention

Therefore, even if there occurs a change in the component composition of the source gas, the combustible gas can be enriched to a higher concentration in an efficient manner, with minimization of the source material loss.

MODES OF EMBODYING THE INVENTION

Embodiments of a combustible gas enrichment apparatus 100 (to be referred to simply as "inventive apparatus 100" hereinafter) will be described next with reference to the accompanying drawings.
[First Embodiment]
<Configuration of Inventive Apparatus>

Figure 1:
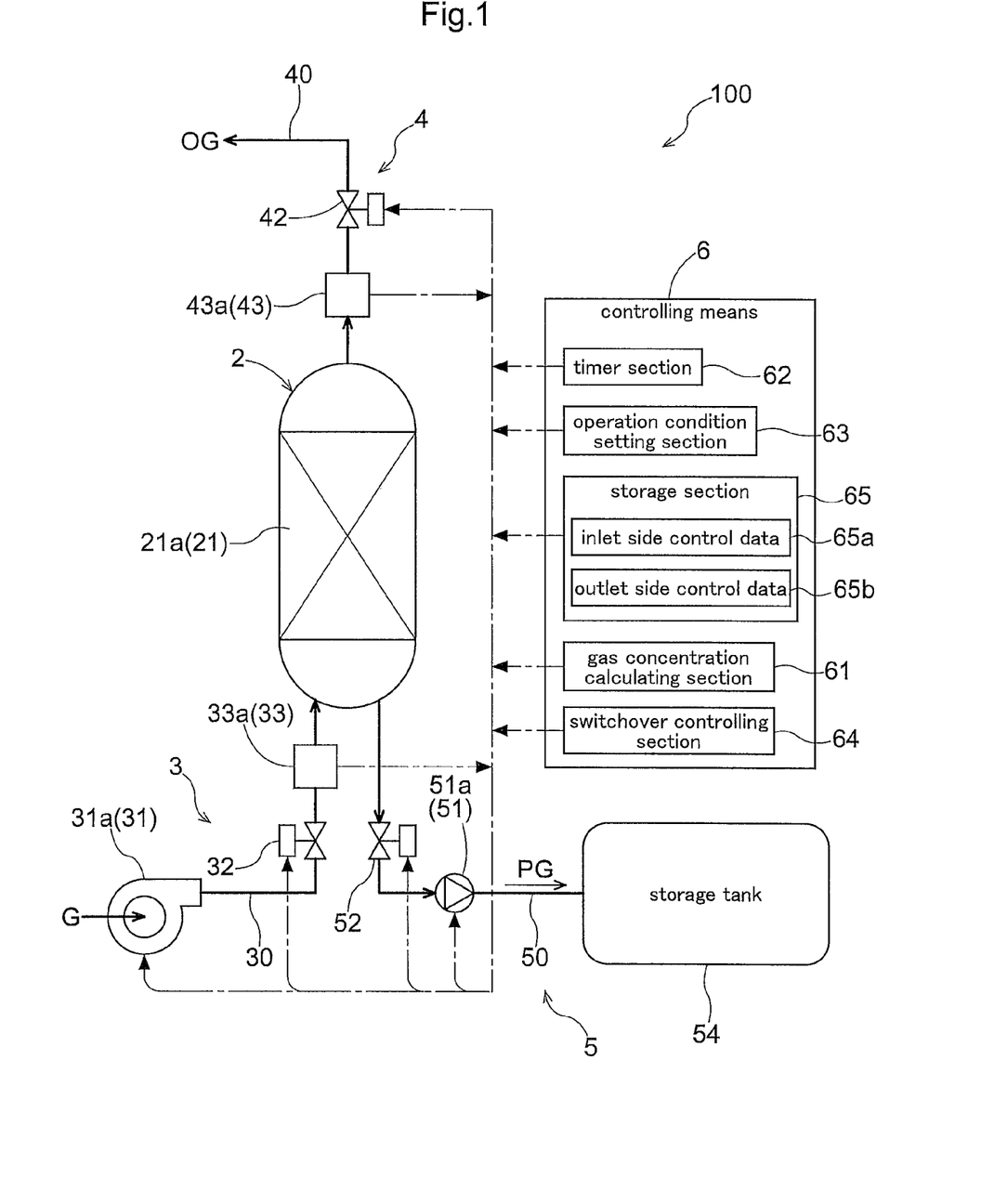
[FIG. 1] is a schematic configuration diagram showing the configuration of a combustible gas enrichment apparatus according to a first embodiment.

FIG. 1 is a view showing the schematic configuration of the inventive apparatus 100. Specifically, the inventive apparatus 100, as shown in FIG. 1, includes an adsorption tower 2 charged with an adsorbent 21, a feeding section 3 and a discharging section 4 for feeding a source gas G and discharging an offgas OG, a collecting section 5 for collecting enriched combustible gas PG, and a controlling means 6 for controlling the operations of the feeding section 3, the discharging section 4 and the collecting section 5. Further, there are provided an inlet side detecting means (detecting means) 33 for detecting the combustible gas concentration in the source gas G to be fed to the interior of the adsorption tower 2 and an outlet side detecting means (detecting means) 43 for detecting the gas past the adsorption tower 2.
<Adsorption Tower>

The adsorption tower 2 is charged with an amount of the adsorbent 21 capable of adsorbing combustible gas, so that the combustible gas contained in the source gas G fed to the adsorption tower 2 can be selectively adsorbed.

In the above, the source gas G is a gas containing the combustible gas and air. Instead, this source gas G can be a coal mine containing methane and air, for instance. Further, the combustible gas is not particularly limited, as long as it is a gas having combustible property. For instance, it can be methane gas contained in a coal mine gas. In the following discussion, the source gas G will be described as a coal mine gas and the this source gas G will be described as containing methane gas and air. Incidentally, a coal mine gas is a gas generated from a coal mine. Though will differ depending on the conditions, the coal mine gas typically contains methane gas by 20-40 Vol % approximately and air (containing mainly nitrogen gas and oxygen gas) by 60-80 Vol % approximately.
<Adsorption Tower: Adsorbent>

The adsorbent 21 is not particularly limited as long as it is capable of selectively adsorbing a combustible gas such as methane gas. As the adsorbent 21, it is advantageous to employ a methane gas adsorbent 21a which is at least one selected from the group consisting of activated carbon, zeolite, silica gel, metallo-organic complex (copper fumarate, copper terephthalate, copper cyclohexanedicarboxylate, etc.) having an average pore diameter ranging from 4.5 to 15 Å as determined by the MP method and a methane adsorption amount of 20 Nml/g or higher at the atmospheric pressure and 298K. Incidentally, the average pore diameter ranges preferably from 4.5 to 10 Å, more preferably, from 5 to 9.5 Å. Further, the methane adsorption amount is preferably 25 Nml/g or higher. For instance, such activated carbon as above can be prepared as follows. An amount of coconut husk or coconut husk charcoal is carbonized completely at 600° C. in nitrogen gas, thereby to obtain an amount of carbide. This is then pulverized into particles having diameters ranging from 1 to 3 mm. The resultant material is used as a carbonaceous material. Then, with using a batch type flow activation reactor, the carbonaceous material is activated at 860° C. in an atmosphere containing water vapor from 10 to 15 Vol. %, carbon dioxide from 15 to 20 Vol. % and the rest of nitrogen With the above-described use of the methane gas adsorbent 21a capable of selectively adsorbing methane gas at the atmospheric pressure and 298K, it is possible for this methane gas adsorbent 21a to adsorb methane gas sufficiently even at the atmospheric pressure and 298K.

Namely, if the methane adsorption amount at the atmospheric pressure and 298K is smaller than 20 Nml/g, the methane gas adsorption performance at lower pressures (in particular, a near-atmospheric pressure) will deteriorate, so that the methane gas concentration in the methane gas after enrichment will be lower and also in order to maintain the adsorption capacity, it will become necessary to increase the amount of the methane gas adsorbent 21a, which leads to enlargement of the apparatus. Incidentally, although the upper limit of the above-described methane gas adsorption amount is not particularly limited, the methane gas adsorption amount of the currently available methane gas adsorbent 21a is about 40 Nm/g or less.

Further, if the average pore diameter as determined by the MP method is smaller than 4.5 Å, this leads to increase in the adsorption amounts of the oxygen gas and nitrogen gas. As a result, there will occur reduction in the methane gas concentration in the methane gas after enrichment or reduction in the adsorption rate as the average pore diameter approaching the molecule diameter of methane gas, so that deterioration in the methane gas adsorption capacity or even total inability of adsorption may result. On the other hand, if the average pore diameter as determined by the MP method is greater than 15 Å, this leads to reduction in the methane gas adsorption capacity at lower pressures (in particular, a near-atmospheric pressure), so that the methane gas concentration in the methane gas after enrichment will be lower and also in order to maintain the adsorption capacity, it will become necessary to increase the amount of the methane gas adsorbent 21a, which leads to enlargement of the apparatus.

Therefore, it is preferred to employ a methane gas adsorbent 21a which is at least one selected from the group consisting of activated carbon, zeolite, silica gel, metallo-organic complex having an average pore diameter ranging from 4.5 to 15 Å as determined by the MP method and a methane adsorption amount of 20 Nml/g or higher at the atmospheric pressure and 298K.

Figure 2:
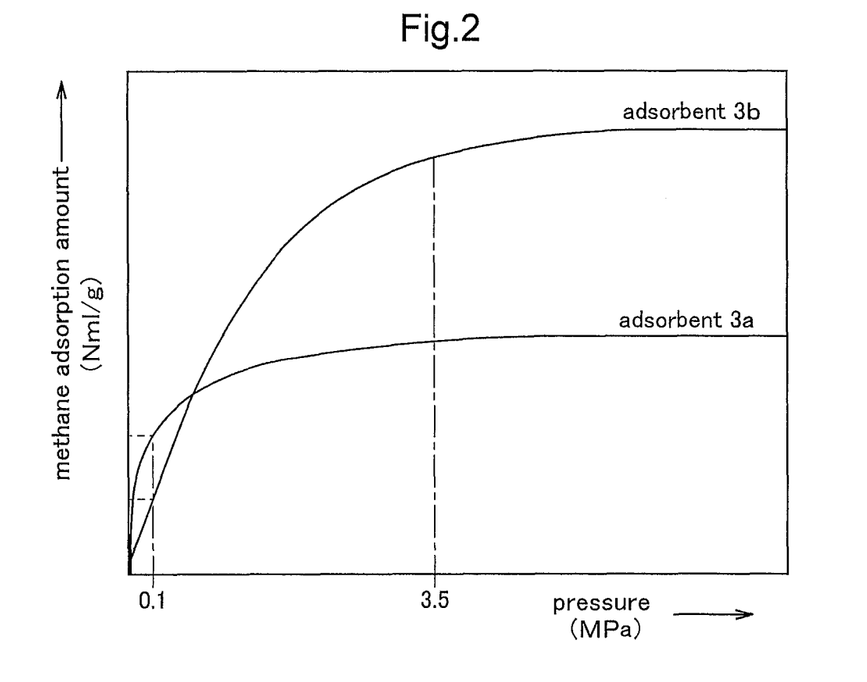
[FIG. 2] is a view showing adsorption characteristics of a methane adsorbent in the present application.

Moreover, preferably, the methane gas adsorbent 21a has a pore volume with the HK determined average pore diameter of 10 Å or less by 50% or more, more preferably by 70% or more, still more preferably by 80% or more. In this case, as the adsorbent having the average pore diameter of 10 Å or less capable of selectively adsorbing methane gas occupies 50% or more of the total pore volume, it is possible to increase the methane gas adsorption amount at a subatmospheric pressure (about 0.1 Mpa), so that methane gas can be adsorbed sufficiently even at such subatmospheric pressure. That is, as shown in FIG. 2, the methane adsorbent 3a having he average pore diameter of 10 Å or less has a greater methane gas adsorption amount at the subatmospheric pressure (about 0.1 Mpa) than a methane gas adsorbent 3b having an average pore diameter greater than 10 Å, so that this basically can be suitably used for adsorption of methane gas at the subatmospheric pressure as is the case with the inventive apparatus 100. Incidentally, in practice, the pore volume of the average pore diameter greater than 4 Å which is the determination limit and less than 10 Å should be 50% or more of the total pore volume. Further, more preferably, the methane gas adsorbent 21a should have the pore volume for the average pore diameter greater than 4 Å and less than 10 Å by 50% or more, On the other hand, the methane gas adsorbent 21a should have such a nitrogen adsorption amount at 77K that its nitrogen adsorption amount at the relative pressure of 0.013 corresponding to the HK determined average pore diameter of 10 Å ranges 50% or more, preferably 70% or more, more preferably 80% or more. In this case, the adsorption amount at the relative pressure of 0.99 represents the total pore volume and the adsorption amount at the relative pressure of 0.013 represents the pore volume of 10 Å or less. The ratio of each value above indicates the ratio of the pores of 10 Å or less being high, like the above-described case.

As a result, in the case of using mixture gas of methane gas and air as the source gas G also, enrichment of methane gas at a near-atmospheric pressure can be carried out easily and efficiently.

<Feeding Section>

To the adsorption tower 2, there is continuously provided the feeding section 3 for feeding the source gas G. The feeding section 3 includes a feeding passage 30 for feeding the source gas G and a blower 31a for introducing the source gas G to the feeding passage 30. Further, the feeding passage 30 incorporates a switching valve (feeding passage switching valve) 32 for effecting feeding of the source gas G to the feeding passage 30, switching over between feeding and stopping, and adjustment of the feeding amount and further incorporates a methane gas concentration detecting means 33a for determining the methane gas concentration of the source gas G fed.

The blower 31a is provided on the feeding passage 30 and configured to feed the source gas G through this feeding passage 30 to the adsorption tower 2 so that the methane gas contained in the source gas G may be adsorbed to the methane gas adsorbent 21a inside the adsorption tower 2. The blower 31a is not particularly limited as long as it is capable of feeding the source gas G without pressure boosting.

Further, the feeding passage switching valve 32 is capable of adjusting the feeding of the source gas G through control by a switchover controlling section 64 of the controlling means 6 to be described later.

<Discharging Section>

To the adsorption tower 2, there is continuously provided the discharging portion 4 for discharging an offgas OG which is a portion of the source gas G fed from the feeding section 3 and not adsorbed to the adsorbent 21. The discharging section 4 includes a discharging passage 40 for discharging the offgas OG (a gas having a very low methane gas concentration and consisting mainly of nitrogen gas and oxygen gas). Further, the discharging passage 40 incorporates a switching valve (discharging passage switching valve) 42 for effecting discharging of the offgas OG to the discharging passage 40, switching over between discharging and stopping, and adjustment of the discharging amount and further incorporates a methane gas concentration detecting means 43a for determining the methane gas concentration of the offgas OG discharged.

Further, the discharging passage switching valve 42 is capable of adjusting the discharging of the offgas OG through control by the switchover controlling section 64 of the controlling means 6 to be described later.

The feeding/discharging means 31 in this invention consists essentially of the feeding section and the discharging section and functions also as a means for introducing the source gas G into the adsorption tower 2 at the near atmospheric pressure without any pressure boosting for adsorption of the methane gas contained in the source gas G and capable also of discharging the offgas OG through the discharging passage 40 to the outside of the adsorption tower 2.

That is, the feeding/discharging means 31 is capable of introducing the source gas G into the adsorption tower 2 at a near-atmospheric pressure without pressure boosting for adsorption of methane gas in the source gas G and discharging the offgas OG through the discharging passage 40.

<Collecting Section>

To the adsorption tower 2, there is continuously provided the collecting section 5 for collecting methane gas as the portion of the source gas G fed from the feeding section 3 and adsorbed to the adsorbent 21 as an enriched combustible gas PG of high concentration. The collecting section 5 includes a collecting passage 50 for drawing the high-concentration combustible gas PG, a vacuum pump 51a as the principal constituent of the collecting means 51 for collecting the high-concentration combustible gas PG from the adsorption tower 2 to the collecting passage 50, and a storage tank 54 for storing the high-concentration combustible gas PG drawn into the collecting passage 50. The collecting passage 50 incorporates a switching valve (collecting passage switching valve) 52 capable of adjusting passage of the enriched combustible gas PG through control by the switchover controlling section 64 of the controlling means 6 to be described later.

The storage tank 54 can vary, as long as it is capable of storing the enriched high-concentration combustible gas PG safely. Using an adsorption type gas tank will be more preferable.

The collecting means 51 causes the methane gas adsorbed to the methane gas adsorbent 21a inside the adsorption tower 2 to be desorbed by reducing the pressure inside the adsorption tower 2 to be lower than the atmospheric pressure and collects this desorbed enriched high-concentration combustible gas PG through the collecting passage 50 and stores this high-concentration combustible gas PG in the storage tank 54.

<Controlling Means>

The specific adjustment operations of the above-described feeding passage switching valve 32, the discharging passage switching valve 42 and the collecting passage switching valve 52 are effected by the switchover controlling section 64 of the controlling means 6.

The controlling means 6 includes:

a gas concentration calculating section 61 for obtaining a methane gas concentration, based on outputs from the respective methane gas concentration detecting means 33a, 43a;

a timer section 62 for metering the period elapsed after switchover of the respective switching valve 32, 42, 52, an operation condition setting section 63 for setting the switchover condition for switching over the respective switching valve 32, 42, 52, a switchover controlling section 64 for controlling switchover of the respective switching valves based on the respective set period set by the operation condition setting section 63, and a storage section 65 for storing, in the form of database, inlet side control data 65a representing the relationship between the methane gas concentration in the source gas G and the adsorption period of feeding the source gas G to the adsorption tower 2 and outlet side control data 65b representing the methane gas concentration in the offgas OG and the correction amount for the adsorption period of feeding the source gas G to the adsorption tower; and the controlling means 5 is configured to function with a storage medium, a CPU, a microcomputer having input and output sections or a computer executable by the computer or a combination of these. And, as this computer executes a predetermined program, the gas concentration calculating section 61, the timer section 62, the operation condition setting section 63, the switchover controlling section 64 are operated to control the operations of the feeding/discharging means 31, the collecting means 51, the feeding passage switching valve 32, the discharging passage switching valve 42, the collecting passage switching valve 52, etc.

The methane gas concentration detecting means 33a as the inlet side detecting means 33 is comprised specifically of a gas sensor having a semiconductor type gas detection device for detecting change in the methane gas concentration in the source gas G and detects the methane gas in the source gas G and transmits its concentration output to the controlling means 6. Upon reception of this output, the controlling means 6 causes the operation condition setting section 63 to refer to the database of the inlet side control data 65a stored in the storage section 65 to obtain a methane gas concentration from the concentration output and an adsorption period until breakthrough of the adsorbent 21 if the adsorption tower 2 is caused to adsorb the methane gas and then sets an adsorption completion period from the start of feeding of the source gas G to the lapse of the adsorption period. With these, the controlling means 6 can refer to the adsorption completion timing set by the timer section 62 in the operation condition setting section 63 and determine the timing for completing the adsorption process.

The methane gas concentration detecting means 43a as the outlet side detecting means 43 is comprised specifically of a gas sensor having a semiconductor type gas detection device for detecting change in the methane gas concentration in the source gas G and detects the methane gas in the source gas G and transmits its concentration output to the controlling means 6. Upon receipt of this output, the controlling means 6 causes the operation condition setting section 63 to refer to the database of the output side control data 65b stored in the storage section 65 to obtain by the operation condition setting section 63 a correction amount for the adsorption period for causing the adsorption tower 2 to adsorb the methane gas and corrects the adsorption completion period from the start of feeding of the source gas G to the lapse of the adsorption period, thereby to change the adsorption completion timing set by the operation condition setting section 63. With this, in the next cycle of adsorption process, a more appropriate adsorption completion timing can be set.

<Operation Control>

Figure 3:
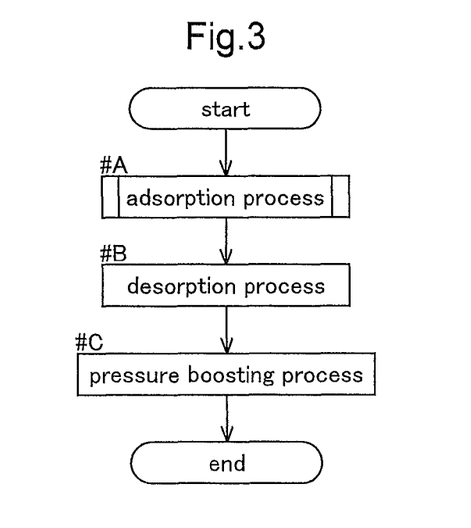
[FIG. 3] is a flowchart showing operations of the combustible gas enrichment apparatus according to the first embodiment.

Next, with reference to FIGS. 3 and 4, the methane gas enriching operation by the inventive apparatus 100 will be described specifically. The inventive apparatus 100 carries out an adsorption process (#A), a desorption process (#B), and a pressure boosting process (#C) for the methane gas.

<Adsorption Process>

Figure 4:
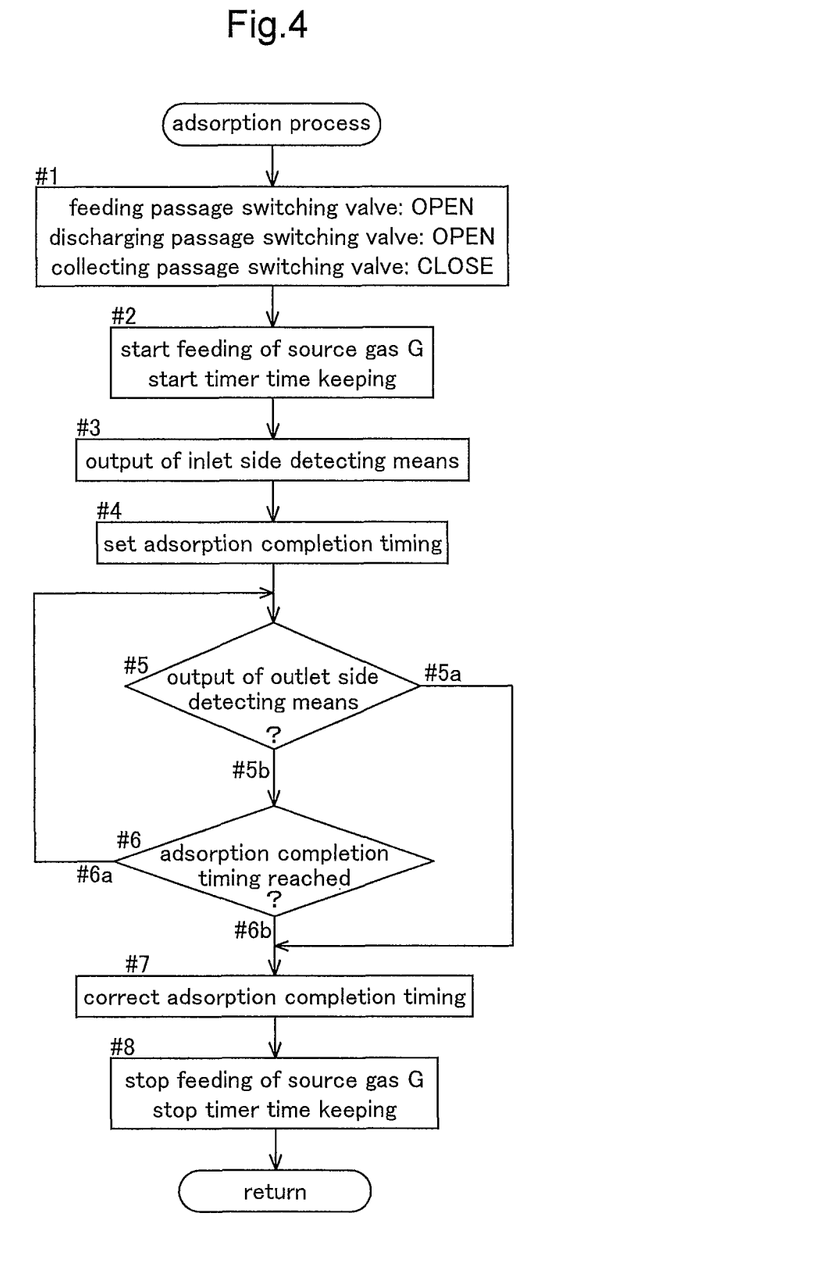
[FIG. 4] is a flowchart showing operations of the combustible gas enrichment apparatus in an adsorption process.
Figure 5:
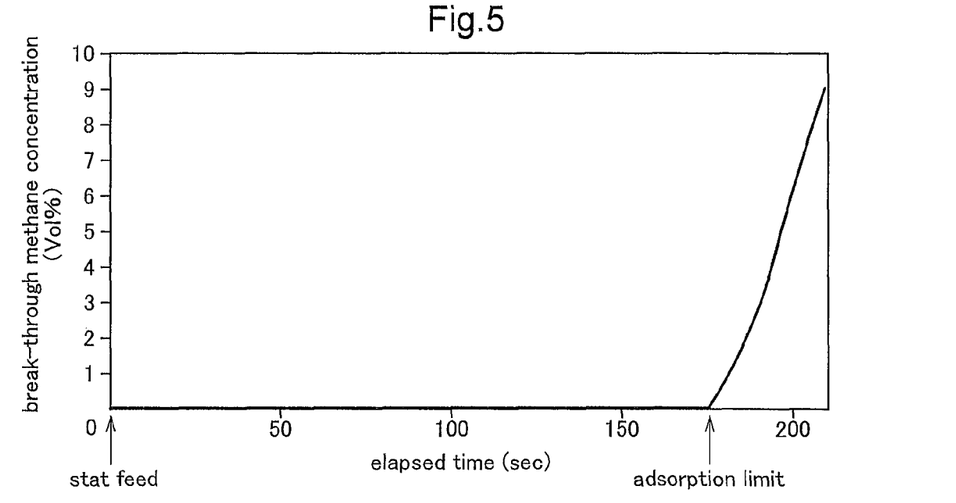
[FIG. 5] is a graph showing changes in methane gas concentration in offgas OG in relation with elapsed periods in the methane gas adsorption process.

As shown in FIG. 4, firstly, the switchover controlling section 64 opens the feeding passage switching valve 32 and the discharging passage switching valve 42, from the foregoing respective closed states of the feeding passage switching valve 32, the discharging passage switching valve 42 and the collecting passage switching valve 52 (#1).

And, the blower 31a is operated to feed the source gas G trough the feeding passage 30 into the adsorption tower 2. With this, methane gas is caused to be adsorbed to the methane gas adsorbent 21a and a portion of the source gas G fed into the adsorption tower 2 and not adsorbed to the methane gas adsorbent 21a is discharged through the discharging passage 40 to the space outside the adsorption tower 2 (#2).

Further, with the above, the timer section 62 of the controlling means 6 starts its time keeping operation and also the methane gas concentration detecting means 33a as the inlet side detecting means 33 determines the methane concentration in the source gas G fed (#3) and if the determined methane gas concentration is within a normal range, reference will be made to the inlet side control data 65a in the storage section 65 to obtain an adsorption period corresponding to this determined methane gas concentration and an adsorption completion period of the operation condition setting section 63 will be set (#4).

Thereafter, the methane gas concentration in the offgas OG is monitored by the methane gas concentration detecting means 43a as the outlet side detecting means 43 (#5). Further, the timer section 62 will continue time keeping operation for judging whether the time-set adsorption completion period has lapsed or not (#6).

The methane gas concentration detecting means 43a detects the methane gas concentration in the offgas OG discharged to the discharging passage 40 and the timer section 63 will continue its time keeping operation. If the detected methane gas concentration exceeds a predetermined concentration (methane gas concentration set threshold value) (#5a) or the period metered by the timer section 62 reaches the adsorption completion timing (the adsorption period reaches the adsorption period set threshold value) (#6b), the operation shifts to a completion operation for completing' the adsorption process. On the other hand, if the detected methane gas concentration is lower than the predetermined concentration (#5b) and the time has not reached the adsorption completion timing (#6a), the time keeping operation by the timer section 62 and the monitoring operation of the methane gas concentration by the outlet side detecting means 43 will be continued. Incidentally, the respective threshold value above is stored as a control parameter stored in the operating condition setting section 63 provided in the controlling means 6 and the threshold value is updated with each cycle of adsorption process.

Upon shifting to the completion process for completing the adsorption process, based on the methane gas concentration output from the methane gas concentration setting means 43a at the timing of the shifting to the completion process, the operation condition setting section 63 refers to the outlet side control data 65b in the storage section 65 to obtain an adsorption completion timing and effects correction of the adsorption completion timing (#7). And, the timer section 63 ends the time keeping operation and the feeding of the source gas G is stopped, whereby the adsorption process is completed (#8).

With the above, it is possible to selectively adsorb methane gas to the methane gas adsorbent 21a with feeding of the source gas G into the adsorption tower 2 at the subatmospheric pressure and it is possible also to prevent effusion of precious methane gas into the offgas OG. That is, until lapse of a predetermined period, methane gas will be adsorbed substantially completely, without flowing to the outside of the adsorption tower 2. And, as the methane gas concentration in the offgas OG is very low, the concentration is out of the explosion range.

<Adsorption Process: Setting of Adsorption Completion Timing>

The setting of the adsorption completion timing at step #4 can be effected as follows for example.

When the methane gas concentration detecting means 33a as the inlet side detecting means 33 detects methane gas contained in the source gas G, its gas detection output will be communicated as a concentration output to the controlling means 6. Upon receipt of this output, the controlling means 6 obtains a methane gas concentration by the gas concentration calculating section 61. On the other hand, the storage section 65 will store in the form of a database, inlet side control data 65a for determining the relationship between a methane gas concentration in the source gas G and the adsorption period of the adsorption process (the period from the start of adsorption process to break-through of the adsorbent 21 of the adsorption tower 2) for each kind of adsorbent 21 and for each set flow rate of the source gas G. From this inlet side control data 65a stored in the storage section 65, the operation condition setting section 63 obtains an adsorption period corresponding to the current operation condition and the methane gas concentration in the source gas G.

For instance, in case 206.7 g of activated carbon having the following adsorption characteristics is charged in a cylindrical adsorption tower having the capacity of 0.333 L and an adsorption process is effected with flowing a source gas G at the flow rate of 1000 Nm³/h, it has been found that substantially the following relationship is established between the methane gas concentration C (%) and the adsorption period T (seconds):

$$T = -1.8935 \cdot C + 143.61$$

And, based on this finding, adsorption periods are stored in advance in the form of database as shown in Table 1 below.

Therefore, suppose the concentration output detected by the inlet side detecting means 33 is 23% in terms of methane gas concentration, the adsorption completion timing will be set to 100 seconds after start of adsorption. Therefore, the adsorption process will be carried out with setting of 100 seconds as the adsorption completion timing.

Activated Carbon:
material property: coconut husk activated carbon
pore diameter: 8.5 Å (average pore diameter as determined by the MP method)
pore volume: 0.45 ml/g (volume determined by the HK method)
ratio of pore volume having average pore diameter of 10 Å or less relative to the total pore volume: 83% (ratio of nitrogen adsorption amount remains same at the relative pressure of 0.013)
specific surface area: 1025 m²/g (specific surface area as determined by the BET method)
methane gas adsorption amount at atmospheric pressure and 298K: 27 Nml/g

TABLE 1

| | gas concentration (%) | | | | | | | | | | |
|---|---|---|---|---|---|---|---|---|---|---|---|
| | 20 | 21 | 22 | 23 | 24 | 25 | 26 | 27 | 28 | 29 | 30 |
| adsorption period (sec.) | 106 | 104 | 102 | 100 | 98 | 96 | 94 | 92 | 91 | 89 | 87 |

<Adsorption Process: Correction of Adsorption Process Completion>

The correction of the adsorption completion timing at step #7 (setting of the adsorption completion timing to be used in the next cycle) can be effected as follows for example.

The methane gas concentration detecting means 43a as the outlet side detecting means 43 detects the methane gas concentration in the offgas OG and transmits its output to the controlling means 6. Upon receipt of this output, the controlling means 6 obtains a methane gas concentration in the gas concentration calculating section 61. On the other hand, due to such factors as deterioration in the adsorption performance of the adsorbent 21 and deterioration in the performance of the blower, etc., the timing of the methane gas breaking through the adsorbent will vary, so that the methane gas concentration at the time of completion of the adsorption process will vary. Hence, the storage section 65 stores, in the form of a database, the outlet side control data 65b comprising correction values for correcting the relationship between the methane gas concentration contained in the offgas OG at the time of completion of adsorption process and the adsorption period and the threshold value of the gas concentration for use as the threshold values at the steps #5, #6 to values corresponding to the methane gas concentration in the current offgas OG. From the respective control data 65a, 65b stored in the storage section 65, the operation condition setting section 63 obtains correction values of an adsorption period and the gas concentration for correcting the threshold values of the adsorption period and gas concentration to values corresponding to the methane gas concentration in the current offgas OG. Then, with using these threshold values of the new adsorption period and gas concentration in the next cycle of adsorption process, a more appropriate adsorption process can be effected.

For instance, in case the above-described adsorption tower is operated under the similar conditions as above, if the current threshold value for the adsorption period is 110 seconds and the current threshold value for the methane gas concentration is 2.5%, then, new threshold values for the adsorption period and gas concentration for use in the next cycle of adsorption process will be corrected as shown in Table 2 below. Therefore, supposing the methane gas concentration in the offgas is found as 2.0% at the time of completion of the adsorption process, in the next cycle of adsorption process, initial setting will be made for correcting the adsorption period to 112 seconds and the methane gas concentration to 2.6%. With this, it becomes possible to effect the adsorption process in an more efficient manner, with effective restriction of the methane gas concentration in the offgas more appropriately.

TABLE 2

|  | gas concentration (%) | | | | | | | |
|---|---|---|---|---|---|---|---|---|
|  | 1.0 | 1.5 | 2.0 | 2.5 | 3.0 | 3.1 | 3.3 | 3.5 |
| adsorption period correction value (sec.) | 2.0 | 2.0 | 2.0 | 1.0 | 0 | −1.0 | −2.0 | −3.0 |
| gas concentration correction value (%) | 0.20 | 0.15 | 0.10 | 0.05 | 0 | −0.05 | −0.10 | −0.15 |

<Desorption Process>

Next, as shown in FIG. 1, after feeding of the source gas G into the adsorption tower 2 is stopped, the switchover controlling section 64 of the controlling means 6 closes the feeding passage switching valve 32 and the discharging passage switching valve 42 and opens the collecting passage switching valve 52 and then causes the vacuum pump 51a to reduce the pressure inside the adsorption tower 2 to a subatmospheric pressure, thus causing the adsorbed methane gas to be desorbed from the methane gas adsorbent 21a and starts collection of the high-concentration combustible gas PG after this enrichment through the collecting passage 50 and stores the gas in the storage tank 54. When the inside of the adsorption tower 2 is depressurized to a predetermined pressure, collecting of the enriched combustible gas PG is stopped and the collecting passage switching valve 52 is closed. These steps together constitute the methane gas desorption process With the above, methane gas can be enriched to a high concentration with adsorption of the methane gas to the methane gas adsorbent 21a and effective reduction in the methane gas concentration in the offgas OG and it is possible to prevent the offgas OG and the enriched combustible gas PG from having concentrations in the explosion range.

Figure 6:
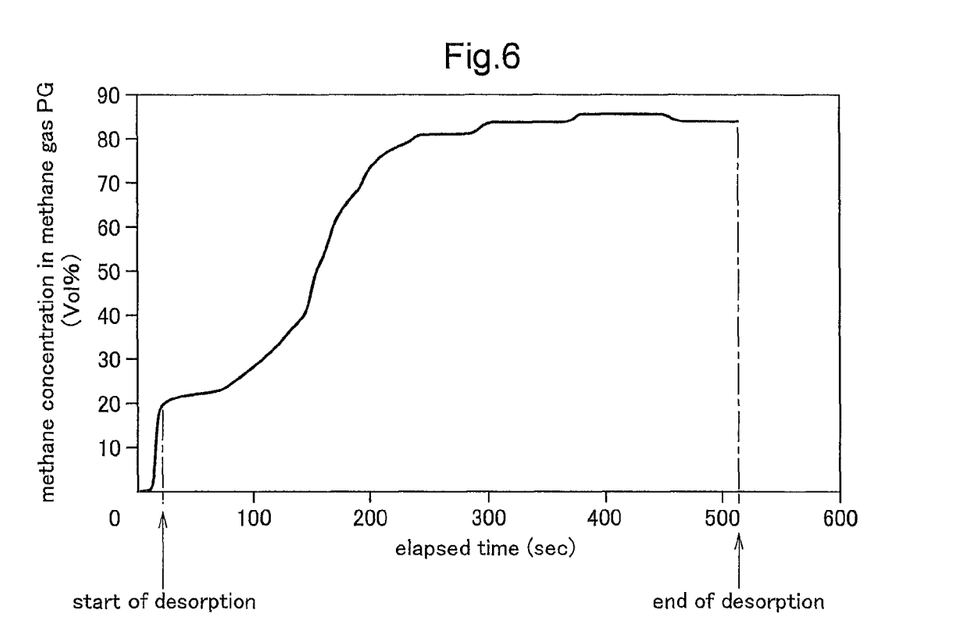
[FIG. 6] is a graph showing changes in methane gas concentration in enriched combustible gas PG in relation with elapsed periods in the methane gas desorption process.
Figure 7:
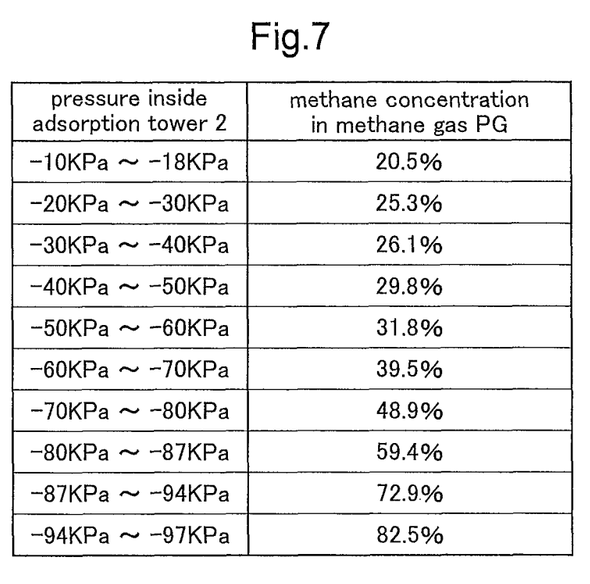
[FIG. 7] is a table showing changes in methane gas concentration in enriched combustible gas PG in relation with pressures inside an adsorption tower 2 in the methane gas desorption process.

That is, as shown in FIG. 6, from the period from the start of the methane gas desorption process to completion of the methane gas desorption process, with time lapse, the methane gas concentration in the enriched combustible gas PG increases. Similarly, as shown in FIG. 7, with the time lapse, the pressure inside the adsorption tower 2 is reduced progressively to the near atmospheric pressure and in association with this, the methane gas concentration in the enriched combustible gas PG increases. In other words, as the pressure reduction is effected in the methane gas desorption process and the inside of the adsorption tower 2 approaches the vacuum with lapse of a certain period, the methane gas concentration in the collected enriched combustible gas PG gradually increases in association therewith. Therefore, it may be understood that it is possible to prevent the methane gas concentration in the enriched combustible gas PG from becoming very high to enter the explosion range. Incidentally, as to the offgas OG also, the methane gas concentration thereof is maintained to a low concentration as described above, so it is possible to prevent this concentration too from being a concentration in the explosion range.

<Pressure Boosting Process>

Next, the switchover controlling section 64 of the controlling means 6 opens the discharging passage switching valve 42 to feed air into the adsorption tower 2 through the discharging passage 40 and then closes this discharging passage switching valve 42.

With the above, the pressure inside the adsorption tower 2 is raised to near atmospheric pressure, so that in the methane gas adsorption process to be subsequently effected, adsorption of the methane gas is facilitated, In the embodiment described above, at the subatmospheric pressure, even if there occurs a change in the methane gas concentration in the source gas G, methane gas can be adsorbed efficiently from this source gas G to the methane gas adsorbent 21a, so that combustible gas PG as a product gas can be enriched to a higher concentration in an efficient and safe manner. Further, even if there occurs a change in the methane gas concentration in the offgas OG due to change occurring the adsorption capacity of the adsorption tower for instance, the methane gas adsorption operation to the methane gas adsorbent 21 can be effected in an efficient manner, so that it is possible to prevent the offgas OG from obtaining a concentration in the explosion range.

[Second Embodiment]

In the foregoing embodiment, when the adsorption process is effected, the adsorption completion timing is set only one time at the time of the start of feeding of the source gas G. Instead, this setting can be effected by a plurality of times. More particularly, in such case when there has occurred a significant change in the methane gas concentration in the fed source gas G, it is anticipated that this will lead to significant deviation in the adsorption completion timing. Therefore, by effecting the step #3 and the step #4 by a plurality of times, such deviation can be corrected for resetting.

The resetting of the adsorption completion timing by the inlet side detecting means 33 in such case as above can be effected as follows for instance.

In the gas concentration calculating section, the methane gas concentration in the source gas G is obtained. And, if there occurs a significant deviation of this methane gas concentration when a predetermined period has elapsed from the start of the adsorption process, an anticipated methane gas concentration for the adsorption tower 2 at the timing of the occurrence of this significant deviation is calculated. Then, in addition to this anticipated methane gas concentration, there is obtained also an anticipated total adsorption amount as a methane gas amount that can be adsorbed by the adsorption tower 2 until its break-through. Then, a difference therebetween is obtained as an anticipated remaining adsorption amount. Then, there is obtained by calculation a correction adsorption period until the break-through of this adsorption tower 2 in case the source gas G having the significantly deviated methane gas concentration is to be adsorbed in the adsorption tower 2 having this anticipated remaining adsorption amount. Then, the period from the timing of occurrence of the significant deviation of the methane gas concentration to the lapse of the adsorption period will be set as the new adsorption completion timing by the operation condition setting section.

If the above-described resetting is effected finely, it is possible to maintain the adsorption completion timing appropriately in realtime in accordance with property change in the source gas G fed.

Further, when a methane gas concentration in the source gas G is to be detected, an elapsed period from the start of feeding of the source gas G will be set and a methane gas concentration output may be obtained at this set period. In the above case, the object can be realized by obtaining a methane gas concentration output for each set period and monitoring these outputs. Incidentally, the methane gas concentration output can be obtained with using a sensor output at the time of lapse of the predetermined period or an average of sensor outputs obtained during the set period can be used also.

[Third Embodiment]

In the foregoing embodiment, the adsorption completion timing for use in the next cycle is corrected based on the methane concentration output in the offgas OG at the time of completion of adsorption. Alternatively, a methane gas concentration output may be obtained after lapse of a predetermined period from start of break-through of methane gas in the offgas OG; and the adsorption completion timing for use in the next cycle may be corrected, based on this methane gas concentration. Namely, in such a situation where there occurs sudden release of methane gas into the offgas OG since start of break-through of the adsorbent 21 or reduction in the gas flow rate due to deterioration of the blower performance due to e.g. deterioration in the adsorption performance resulting from e.g. deterioration of the adsorbent 21, it is surmised that it takes longer until the break-through of the adsorbent. In such case, it is possible to eliminate the risk of inadvertent release of a great amount of methane gas or deterioration in the operational efficiency.

Resetting of the adsorption completion timing by the outlet side controlling means 43 in such case as above can be effected as follows for instance.

In the gas concentration calculating section, the methane gas concentration in the offgas OG is obtained and it is determined how much this concentration has risen after lapse of the predetermined period from the break-through of the adsorbent 21. The controlling means judges in the operation condition setting section whether this value is to reach a predetermined methane gas concentration at the currently set adsorption completion timing or not. And, if it is determined that the methane concentration is high, the adsorption completion timing will be reset to an earlier timing. Whereas, if it is determined that the methane concentration is low, the adsorption completion timing will be reset to a later timing.

If the above-described resetting is effected finely, it is possible to adjust the adsorption completion timing appropriately in realtime in accordance with property change in the offgas OG fed.

Further, when a methane gas concentration in the offgas OG is to be detected, an elapsed period from the start of break-through of the methane gas will be set and a methane gas concentration output may be obtained at this set period. In the above case, the object can be realized by obtaining a methane gas concentration output for each set period and monitoring these outputs. Further, the judgment of the methane gas concentration in the operation condition setting section may be made by referring to the absolute value of the methane gas concentration or the absolute value of the methane gas concentration output per se. Alternatively, the judgment can be made based on the rate of its change, as well.

[Other Embodiments]

(1) In the first through third embodiments described above, a dehumidifier may be provided so that moisture in the source gas G fed may be removed to allow appropriate adsorption of combustible gas to the adsorbent 21. More particularly, by disposing a dehumidifier on the feeding passage 30, moisture in the source gas G can be removed. Further, by packing the adsorption tower 2 with an amount of water adsorbent cable of selectively adsorbing water, it is also possible to prevent reduction of the combustible gas adsorption performance due to water.

(2) In the first through third embodiments described above, the adsorption tower 2 is charged with the adsorbent 21. This adsorbent may be used singly or can be a mixture of two or more kinds.

(3) It is possible to effect a purging process for feeding the enriched combustible gas PG as a product gas to the adsorption tower 2 after completion of its adsorption process, thereby to purge any sundry gas such as air still remaining in the tower. For effecting such surging process, a purging passage will be provided for feeding the enriched combustible gas PG as a product gas from the storage tank to the adsorption tower 2 and there may be provided also a storage section for storing the offgas OG purged by the purging process and a circulating passage for recirculation thereof to the source side. With this, it becomes possible to further enhance the purity of the enriched combustible gas PG as a product gas obtained from the adsorption tower 2.

(4) In the first through third embodiments described above, a single adsorption tower 2 is employed. Instead, a plurality of adsorption towers 2, 2, 2 may be employed. For instance, in the case of using two towers, the combustible gas enrichment apparatus may be operated such that the first adsorption tower 2 is operated in the sequence of: A: combustible gas adsorption process, B: combustible gas desorption process and C: pressure equalization process whereas in correspondence therewith, the second adsorption tower 2 is operated in the sequence of A: combustible gas desorption process, B: combustible gas adsorption process and C: pressure equalization process, thereby to carryout combustible gas enrichment in a continuous manner.

In the above, the pressure equalization process is for realizing efficient pressure adjustment with less energy loss, by introducing the exhaust gas from an adsorption tower 2 having a high inside pressure to an adsorption tower 2 having a low inside pressure. That is, as exhaust gas from an adsorption tower 2 under a pressure boosted state to an adsorption tower 2 under a pressure reduced state, combustible gas contained in the offgas from the adsorption tower 2 can be collected in the pressure equalization process. Further, since it is possible to set the desorbed combustible gas concentration at the time of start of the desorption process high, the above arrangement can contribute to increase of the purity of the combustible gas PG as well.

(5) In the first through third embodiments described above, coal mine gas is employed as the source gas G and methane gas is employed as the combustible gas. However, the source gas G is not particularly limited as long as it is a gas containing a combustible gas and air. Further, the combustible gas is not particularly limited, either, as long as it is a gas having combustible property. Further, the physical properties of the adsorbent 21 may vary appropriately in accordance with the kind of the combustible gas. For instance, if an average pore diameter which is about 1.2 to two times greater than the average pore diameter of the combustible gas is selected as the average pore diameter of the adsorbent 21, selective adsorption of the combustible gas is made possible.

(6) In the pressure boosting process, air is fed to the adsorption tower 2, in the foregoing. The invention is not limited thereto. It is also possible to employ ventilation methane gas (normally having a methane gas concentration of 0.5%) which is discharged into the atmosphere upon air ventilation into the mine at the time of underground coal mining. With this, methane gas contained in the ventilation air methane gas can be collected, and effective and useful collection of the ventilation methane gas conventionally discharged into the atmosphere is made possible.

INDUSTRIAL APPLICABILITY

The combustible gas enrichment apparatus according to the present invention can be effectively used as a technique which allows efficient enrichment of combustible gas to a higher concentration with minimization of source material loss even if there occurs a change in the component composition of the source gas G in the course of enrichment of the combustible gas.

DESCRIPTION OF REFERENCE MARKS/NUMERALS

100 combustible gas enrichment apparatus (inventive apparatus)
2 adsorption tower
21 adsorbent
21a methane gas adsorbent
3 feeding section
30 feeding passage
31 feeding/discharging means
31a blower
32 switching valve (feeding passage switching valve)
33 inlet side detecting means (detecting means)
33a methane gas concentration detecting means
4 discharging section
40 discharging passage
42 switching valve (discharging passage switching valve)
43 outlet side detecting means (detecting means)
43a methane gas concentration detecting means
5 collecting section
50 collecting passage
51 collecting means
51a vacuum pump
52 switching valve (collecting passage switching valve)
54 storage tank
6 controlling means
61 gas concentration calculating section
62 timer section
63 operation condition setting section
64 switchover controlling section
65 storage section
65a inlet side control data
65b outlet side control data
G source gas (coal mine gas, combustible gas)
PG high-concentration (enriched) combustible gas (product gas)
OG offgas

The invention claimed is:

1. A combustible gas enrichment apparatus comprising:
an adsorption tower charged with an adsorbent for adsorbing a combustible gas;
a feeding/discharging means for feeding a source gas containing the combustible gas and air to the adsorption tower via a feeding passage and discharging an offgas which is the portion of the source gas not adsorbed to the adsorbent to the outside of the adsorption tower via a discharging passage;
a collecting means for desorbing the combustible gas adsorbed to the adsorbent by depressurizing the inside of the adsorption tower to a subatmospheric pressure and collecting the desorbed combustible gas through a collecting passage; and
a controlling means for sequentially effecting a combustible gas adsorption process for causing the feeding/discharging means to feed the source gas to the adsorption tower and to discharge the offgas from the adsorption tower and a combustible gas desorption process for causing the collecting means to desorb and collect the combustible gas by the collecting means;
wherein the enrichment apparatus further comprises:
a detecting means for detecting the concentration of the combustible gas in the source gas which is fed to the adsorption tower in the adsorption process; and
an operation condition setting section for adjusting an adsorption completion timing setpoint for the controlling means to complete the adsorption process based on the combustible gas concentration detected by the detecting means.

2. The combustible gas enrichment apparatus according to claim 1, wherein the operation condition setting section includes a storage section for storing correlation between combustible gas concentrations and adsorption completion timings in the form of a database.

3. A combustible gas enrichment apparatus comprising:
an adsorption tower charged with an adsorbent for adsorbing a combustible gas;
a feeding/discharging means for feeding a source gas containing the combustible gas and air to the adsorption tower via a feeding passage and discharging an offgas which is the portion of the source gas not adsorbed to the adsorbent to the outside of the adsorption tower via a discharging passage;
a collecting means for desorbing the combustible gas adsorbed to the adsorbent by depressurizing the inside of the adsorption tower to a subatmospheric pressure and collecting the desorbed combustible gas through a collecting passage; and
a controlling means for sequentially effecting a combustible gas adsorption process for causing the feeding/discharging means to feed the source gas to the adsorption tower and to discharge the offgas from the adsorption tower and a combustible gas desorption process for causing the collecting means to desorb and collect the combustible gas;
wherein the enrichment apparatus further comprises:
a detecting means for detecting the concentration of the combustible gas discharged from the adsorption tower in the adsorption process; and
an operation condition setting section for adjusting an adsorption completion timing setpoint for the controlling means to complete the adsorption process based on the combustible gas concentration detected by the detecting means.

4. The combustible gas enrichment apparatus according to claim 3, wherein the adsorption completion timing setpoint for the controlling means to complete the adsorption process is adjusted based on a threshold value for the concentration of the combustible gas discharged from the adsorption tower;
there is provided a storage section for storing, in the form of a database, correlation between a combustible gas concentration detected by the detecting means and a gas concentration correction value for correcting the threshold value; and
the operation condition setting means adjusts the adsorption completion timing setpoint, based on the correlation obtained in advance.

5. The combustible gas enrichment apparatus according to claim 3, wherein the adsorption completion timing setpoint for the controlling means to complete the adsorption process is adjusted based on a combustible gas concentration detected by the detecting means taken at a lapsed period from the start of the adsorption process;

there is provided a storage section for storing, in the form of a database, correlation between a combustible gas concentration detected by the detecting means and the lapsed period; and the operation condition setting means adjusts the adsorption completion timing setpoint, based on the correlation obtained in advance.

6. The combustible gas enrichment apparatus according to claim 4, wherein the adsorption completion timing setpoint for the controlling means to complete the adsorption process is adjusted based on a combustible gas concentration detected by the detecting means taken at a lapsed period from the start of the adsorption process;

there is provided a storage section for storing, in the form of a database, correlation between a combustible gas concentration detected by the detecting means and the lapsed period; and the operation condition setting means adjusts the adsorption completion timing setpoint, based on the correlation obtained in advance.

* * * * *